(12) United States Patent
Goto et al.

(10) Patent No.: US 7,158,713 B2
(45) Date of Patent: Jan. 2, 2007

(54) INFORMATION RECORDING AND REPRODUCING APPARATUS

(75) Inventors: Nobuyuki Goto, Chigasaki (JP); Noriaki Fukutsu, Yokohama (JP)

(73) Assignee: Victor Company Japan, Ltd., Yokohama (JP)

( * ) Notice: Subject to any disclaimer, the term of this patent is extended or adjusted under 35 U.S.C. 154(b) by 1381 days.

(21) Appl. No.: 09/962,239

(22) Filed: Sep. 26, 2001

(65) Prior Publication Data

US 2002/0037159 A1 Mar. 28, 2002

(30) Foreign Application Priority Data

| Sep. 27, 2000 | (JP) | 2000-294230 |
| Sep. 27, 2000 | (JP) | 2000-294232 |
| Sep. 27, 2000 | (JP) | 2000-294233 |
| Aug. 23, 2001 | (JP) | 2001-253258 |

(51) Int. Cl.
*H04N 5/91* (2006.01)

(52) U.S. Cl. .................. 386/69; 386/70; 348/333.05

(58) Field of Classification Search ............... 386/6–8, 386/45, 46, 52, 68–70, 125, 126; 348/333.05
See application file for complete search history.

(56) References Cited

U.S. PATENT DOCUMENTS 5,126,851 A 6/1992 Yoshimura et al.

| 6,556,770 B1* | 4/2003 | Ando et al. ................... 386/52 |
| 6,728,476 B1* | 4/2004 | Haseno ........................ 386/125 |
| 6,734,909 B1* | 5/2004 | Terane et al. ............ 348/333.05 |
| 6,829,428 B1* | 12/2004 | Quintos ....................... 386/69 |

FOREIGN PATENT DOCUMENTS

| JP | 04117686 | 4/1992 |
| JP | 08163496 | 6/1996 |
| JP | 10200865 | 7/1998 |
| JP | 2000069380 | 3/2000 |
| JP | 2000165787 | 6/2000 |
| WO | WO 9938166 | 7/1999 |

\* cited by examiner

*Primary Examiner*—James J. Groody
*Assistant Examiner*—Christopher Onuaku
(74) *Attorney, Agent, or Firm*—Louis Woo

(57) ABSTRACT

In an information recording and reproducing apparatus, a plurality of first video-contents signals are recorded on a first recording medium. A plurality of second video-contents signal are recorded on a second recording medium. The second recording medium differs from the first recording medium, and is removable. Signals representative of thumbnails are generated in response to the second video-contents signals respectively. The signals representative of the thumbnails are recorded on the first recording medium in cases where the plurality of the second video-contents signals are recorded on the second recording medium. The signals representative of the thumbnails are reproduced from the first recording medium. The thumbnails represented by the reproduced signals are displayed.

9 Claims, 9 Drawing Sheets

EVERY-WEEK RESERVED PROGRAM (HDD NAVI ONLY)

EVERY-DAY RESERVED PROGRAM (HDD NAVI ONLY)

COPY INHIBITION (HDD NAVI ONLY)

HEAD-LESS PROGRAM (VHS NAVI ONLY)

STEREOPHONIC BROADCASTING PROGRAM

BILINGUAL BROADCASTING PROGRAM

TIMER-RECORDED PROGRAM

AUTO CM CUT PROGRAM (VHS NAVI ONLY)

INFORMATION RECORDING AND REPRODUCING APPARATUS

BACKGROUND OF THE INVENTION

1. Field of the Invention

This invention relates to an apparatus for recording and reproducing information on and from a large-capacity recording medium (for example, a hard disk or a semiconductor memory) and a removable recording medium.

2. Description of the Related Art

A VTR (video tape recorder) records and reproduces information representative of video contents on and from a magnetic tape. It is known to record and reproduce video-contents information on and from a hard disk or a semiconductor memory.

There is a dual apparatus which can record and reproduce video-contents information on and from a magnetic tape and a hard disk. The magnetic tape is a removable recording medium. The dual apparatus can be used to implement the following process. A sequence of broadcasted television programs is continuously recorded on the hard disk, while desired ones selected from the programs recorded on the hard disk are dubbed onto the magnetic tape. The dual apparatus is incapable of indicating the order in which the selected programs are dubbed onto the magnetic tape. This is inconvenient to a user.

SUMMARY OF THE INVENTION

It is an object of this invention to provide an information recording and reproducing apparatus which can indicate the order in which programs are recorded on a removable recording medium such as a magnetic tape.

A first aspect of this invention provides an information recording and reproducing apparatus comprising first means for recording a plurality of first video-contents signals on a first recording medium; second means for recording a plurality of second video-contents signal on a second recording medium differing from the first recording medium and being removable; third means for generating signals representative of thumbnails in response to the second video-contents signals respectively and recording the signals representative of the thumbnails on the first recording medium in cases where the second means records the plurality of the second video-contents signals on the second recording medium; and fourth means for reproducing the signals representative of the thumbnails from the first recording medium to enable the thumbnails to be displayed.

A second aspect of this invention is based on the first aspect thereof, and provides an information recording and reproducing apparatus further comprising fifth means for designating ones among the displayed thumbnails, sixth means for designating an order about the designated thumbnails, and seventh means for sequentially reproducing ones among the second video-contents signals, which correspond to the designated thumbnails respectively, from the second recording medium in an order corresponding to the designated order.

A third aspect of this invention is based on the first aspect thereof, and provides an information recording and reproducing apparatus further comprising fifth means for generating signals representative of thumbnails in response to the first video-contents signals respectively and recording the signals representative of the thumbnails on the first recording medium in cases where the first means records the plurality of the first video-contents signals on the first recording medium, sixth means for dubbing ones among the first video-contents signals from the first recording medium onto the second recording medium as new second video-contents signals recorded on the second recording medium, and seventh means for using the signals representative of the thumbnails corresponding to the dubbed ones among the first video-contents signals as signals representative of thumbnails corresponding to the new second video-contents signals.

A fourth aspect of this invention is based on the first aspect thereof, and provides an information recording and reproducing apparatus wherein the third means comprises means for, when the second means starts recording each of the plurality of the second video-contents signals on the second recording medium, capturing a picture represented by each of the plurality of the second video-contents signals as a thumbnail, and means for updating the thumbnails.

A fifth aspect of this invention is based on the first aspect thereof, and provides an information recording and reproducing apparatus further comprising fifth means for designating one among the displayed thumbnails, sixth means for reproducing one among the second video-contents signals, which corresponds to the designated thumbnail, from the second recording medium, seventh means for displaying the second video-contents signal reproduced by the sixth means, eighth means for capturing a picture represented by the displayed second video-contents signal at a designated moment, and ninth means for replacing the thumbnail corresponding to the displayed second video-contents signal by the captured picture.

A sixth aspect of this invention provides an information recording and reproducing apparatus comprising first means for recording a plurality of video-contents signals on a recording medium; second means for generating signals representative of thumbnails in response to the video-contents signals respectively and recording the signals representative of the thumbnails on the recording medium in cases where the first means records the plurality of the video-contents signals on the recording medium; third means for reproducing the signals representative of the thumbnails from the recording medium to enable the thumbnails to be displayed; fourth means for designating ones among the displayed thumbnails; fifth means for designating an order about the designated thumbnails and assigning and superimposing order numbers to and over the designated thumbnails in accordance with the designated order; and sixth means for sequentially reproducing ones among the video-contents signals, which correspond to the designated thumbnails respectively, from the recording medium in an order corresponding to the order designated by the fifth means.

A seventh aspect of this invention provides an information recording and reproducing apparatus comprising first means for recording a plurality of video-contents signals on a first recording medium; second means for generating signals representative of thumbnails in response to the video-contents signals respectively and recording the signals representative of the thumbnails on the first recording medium in cases where the first means records the plurality of the video-contents signals on the first recording medium; third means for reproducing the signals representative of the thumbnails from the first recording medium to enable the thumbnails to be displayed; fourth means for designating ones among the displayed thumbnails; fifth means for designating an order about the designated thumbnails; and sixth means for sequentially dubbing ones among the video-contents signals, which correspond to the designated thumbnails respectively, from the first recording medium onto a second recording medium in an order corresponding to the order designated by the fifth means, the second recording medium differing from the first recording medium and being removable.

An eighth aspect of this invention is based on the seventh aspect thereof, and provides an information recording and reproducing apparatus further comprising seventh means for assigning and superimposing order numbers to and over the designated thumbnails in accordance with the order designated by the fifth means.

A ninth aspect of this invention provides an information recording and reproducing apparatus comprising first means for recording a plurality of video-contents signals on a first recording medium; second means for generating signals representative of thumbnails in response to the video-contents signals respectively and recording the signals representative of the thumbnails on the first recording medium in cases where the first means records the plurality of the video-contents signals on the first recording medium; third means for reproducing the signals representative of the thumbnails from the first recording medium to enable the thumbnails to be displayed; fourth means for designating ones among the displayed thumbnails; fifth means for designating an order about the designated thumbnails; sixth means for sequentially reproducing ones among the video-contents signals, which correspond to the designated thumbnails respectively, from the first recording medium in an order corresponding to the order designated by the fifth means to enable the sequentially reproduced video-contents signals to be displayed; and seventh means for sequentially dubbing ones among the video-contents signals, which correspond to the designated thumbnails respectively, from the first recording medium onto a second recording medium in an order corresponding to the order designated by the fifth means, the second recording medium differing from the first recording medium and being removable; wherein the first means comprises means for compressing the video-contents signals into compression-resultant signals, and means for recording the compression-resultant signals on the first recording medium, and wherein each of the sixth means and seventh means comprises means for reading out ones among the compression-resultant signals, which correspond to the designated thumbnails respectively, from the first recording medium, and means for expanding the read-out compression-resultant signals into the video-contents signals.

A tenth aspect of this invention provides an information recording and reproducing apparatus comprising first means for recording a plurality of video-contents signals on a recording medium; second means for generating signals representative of thumbnails in response to the video-contents signals respectively and recording the signals representative of the thumbnails on the recording medium; third means for reproducing the signals representative of the thumbnails from the recording medium and enabling the thumbnails to be displayed in first thumbnail display positions respectively; and fourth means for, in the presence of a video-contents signal in recording reservation, generating a signal representative of a condition of reservation of the video-contents signal in recording reservation and enabling the condition of reservation to be displayed in a second thumbnail display position next to end one of the first thumbnail display positions.

An eleventh aspect of this invention is based on the tenth aspect thereof, and provides an information recording and reproducing apparatus further comprising fifth means for recording the video-contents signal in reservation on the recording medium, sixth means for generating a signal representative of a thumbnail in response to the video-contents signal in reservation when the fifth means starts recording the video-contents signal in reservation, seventh means for recording the signal representative of the thumbnail corresponding to the video-contents signal in reservation on the recording medium, and eighth means for replacing the condition of reservation by the thumbnail corresponding to the video-contents signal in reservation and enabling the thumbnail to be displayed in the second thumbnail display position.

A twelfth aspect of this invention is based on the eleventh aspect thereof, and provides an information recording and reproducing apparatus further comprising ninth means for generating a signal representative of a new thumbnail in response to the video-contents signal in reservation at a moment a predetermined-time after the sixth means generates the signal representative of the old thumbnail, tenth means for recording the signal representative of the new thumbnail over the signal representative of the old thumbnail on the recording medium, and eleventh means for replacing the old thumbnail by the new thumbnail and enabling the new thumbnail to be displayed in the second thumbnail display position.

A thirteenth aspect of this invention provides an information recording and reproducing apparatus comprising first means for recording a plurality of video-contents signals on a recording medium; second means for generating signals representative of thumbnails in response to the video-contents signals respectively and recording the signals representative of the thumbnails on the recording medium; third means for reproducing the signals representative of the thumbnails from the recording medium and enabling the thumbnails to be displayed; and fourth means for enabling icons to be displayed at positions near the displayed thumbnails, the icons representing conditions of the video-contents signals.

DETAILED DESCRIPTION OF THE INVENTION

First Embodiment

Figure 1:
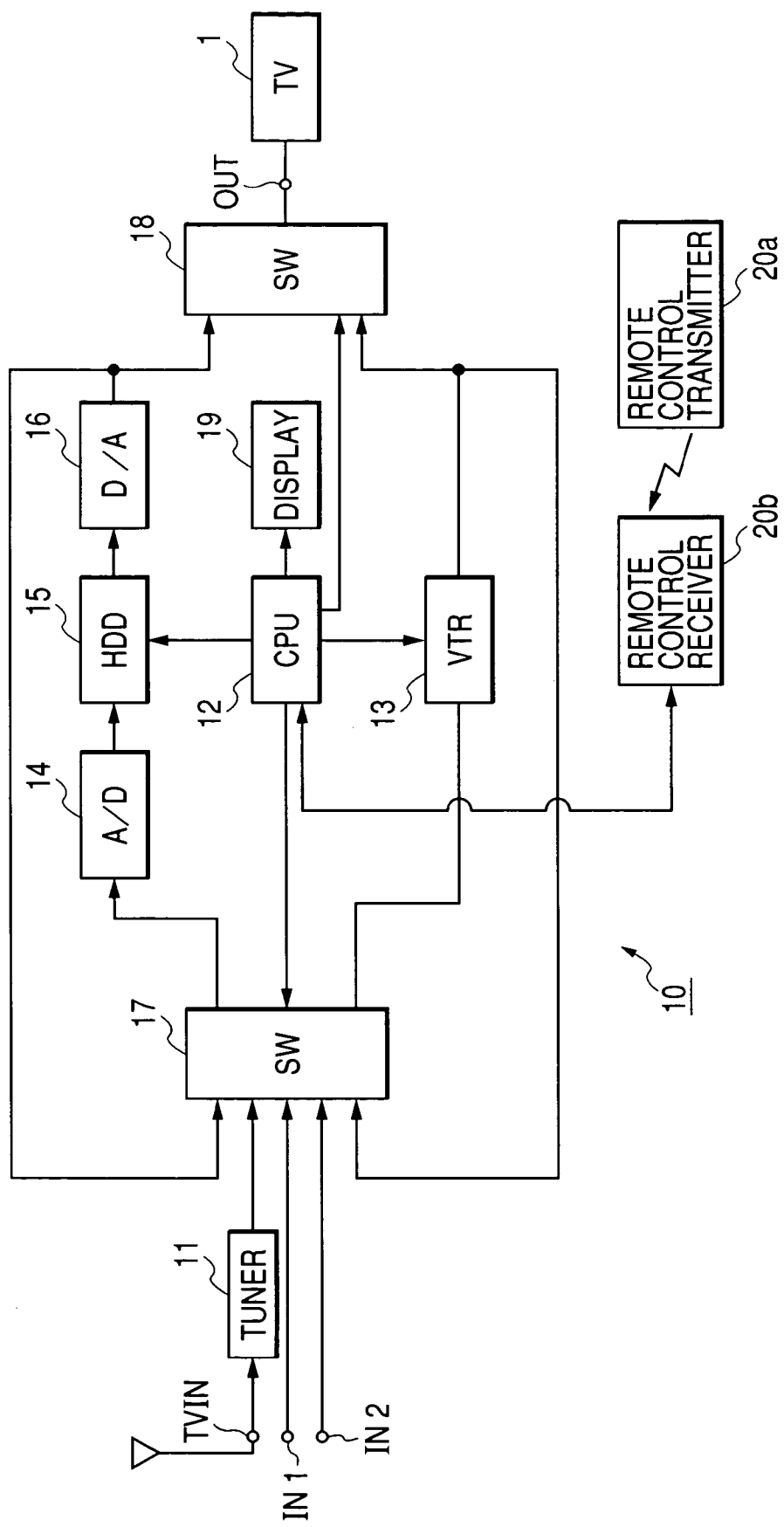
FIG. 1 is a block diagram of an information recording and reproducing apparatus according to a first embodiment of this invention.

FIG. 1 shows an information recording and reproducing apparatus 10 according to a first embodiment of this invention.

The apparatus 10 includes a television tuner 11, a CPU 12, a VTR (video tape recorder) 13, an A/D converter 14, an HDD (hard disk drive) 15, a D/A converter 16, switches 17 and 18, a display 19, a remote control transmitter 20a, a remote control receiver 20b, a television input terminal TVIN, input terminals IN1 and IN2, and an output terminal OUT. The HDD 15 includes a hard-disk accessing arrangement and signal processing circuits. The display 19 includes, for example, a liquid crystal display.

An antenna (no reference character) can be connected with the television input terminal TVIN. The television input terminal TVIN leads to the tuner 11. The tuner 11 is connected to the switch 17. The input terminals IN1 and IN2 are directly connected to the switch 17. The CPU 12 is connected with the VTR 13, the HDD 15, the switches 17 and 18, the display 19, and the remote control receiver 20b. The VTR 13 is connected with the switches 17 and 18. The A/D converter 14 is connected between the switch 17 and the HDD 15. The HDD 15 is connected with the D/A converter 16. The D/A converter 16 is connected with the switches 17 and 18. The switch 18 is connected with the output terminal OUT. A television receiver 1 can be connected with the output terminal OUT. The remote control transmitter 20a can communicate with the remote control receiver 20b by wireless.

The remote control transmitter 20a has a body provided with operation buttons such as channel selection CH1–CH12 buttons, an HDD button, a VHS button, "+"-arranged cursor-moving selection buttons, a decision (OK) button, an end (navigation) button, and a memory button. The operation buttons can be actuated by a user. When the operation buttons are actuated, the remote control transmitter 20a generates corresponding command signals. The remote control transmitter 20a sends the generated command signals to the remote control receiver 20b. The remote control receiver 20b transfers the command signals to the CPU 12.

The CPU 12 includes a combination of an input/output port, a processing section, a RAM, and a ROM. The CPU 12 operates in accordance with a control program stored in the ROM. The control program is designed to enable the CPU 12 to implement steps of operation which will be mentioned later. The CPU 12 controls the VTR 13, the HDD 15, the switches 17 and 18, and the display 19 in response to command signals fed via the remote control receiver 20b.

An RF television signal can be fed to the tuner 11 via the television input terminal TVIN. The tuner 11 converts the RF television signal into a baseband signal representative of a television program, that is, contents (video contents or audio/video contents). The tuner 11 outputs the contents signal to the switch 17. Signals representative of contents (video contents or audio/video contents) can be fed to the switch 17 via the input terminals IN1 and IN2. A contents signal outputted from the D/A converter 16 is fed to the switch 17. A contents signal outputted from the VTR 13 is fed to the switch 17.

The CPU 12 changes the switch 17 among different states. When the CPU 12 sets the switch 17 to its first state, the switch 17 selects designated one among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the selected contents signal to the A/D converter 14. Thus, in this case, the A/D converter 14 changes the selected contents signal into a corresponding digital contents signal, and outputs the digital contents signal to the HDD 15. The digital contents signal can be recorded by the HDD 15. When the CPU 12 sets the switch 17 to its second state, the switch 17 selects designated one among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the selected contents signal to the VTR 13. Thus, in this case, the selected contents signal can be recorded by the VTR 13. When the CPU 12 sets the switch 17 to its third state, the switch 17 selects first and second designated ones among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the first and second selected contents signals to the A/D converter 14 and the VTR 13, respectively. Thus, in this case, the A/D converter 14 changes the first selected contents signal into a corresponding digital contents signal, and outputs the digital contents signal to the HDD 15. The digital contents signal can be recorded by the HDD 15. At the same time, the second selected contents signal can be recorded by the VTR 13.

The HDD 15 is provided with a recording medium, that is, a hard disk. The HDD 15 receives the contents signal from the A/D converter 14. The HDD 15 can record the output signal (the contents signal) from the A/D converter 14 on the hard disk while being controlled by the CPU 12. The HDD 15 can reproduce the recorded contents signal from the hard disk while being controlled by the CPU 12. The HDD 15 outputs the reproduced contents signal to the D/A converter 16. The D/A converter 16 changes the reproduced contents signal into a corresponding analog contents signal. The D/A converter 16 outputs the analog contents signal to the switches 17 and 18.

The VTR 13 is provided with a removable recording medium, that is, a magnetic tape. The VTR 13 receives the selected contents signal from the switch 17. The VTR 13 can record the selected contents signal from the switch 17 on the magnetic tape while being controlled by the CPU 12. The VTR 13 can reproduce the recorded contents signal from the magnetic tape while being controlled by the CPU 12. The VTR 13 outputs the reproduced contents signal to the switches 17 and 18.

As mentioned above, the contents signal outputted from the D/A converter 16 is fed to not only the switch 17 but also the switch 18. Similarly, the contents signal outputted from the VTR 13 is fed to not only the switch 17 but also the switch 18. Under the control by the CPU 12, the switch 18 selects designated one out of the contents signal fed from the D/A converter 16 and the contents signal fed from the VTR 13. The switch 18 feeds the selected contents signal to the output terminal OUT. The selected contents signal is transmitted via the output terminal OUT to the television receiver 1. A video signal in the selected contents signal can be indicated on a display of the television receiver 1 while an audio signal therein can be converted into corresponding sounds by loudspeakers of the television receiver 1.

In the apparatus 10, the recording of a first contents signal by one of the VTR 13 and the HDD 15 and the reproduction of a second contents signal by the other can simultaneously be executed.

Figure 2:
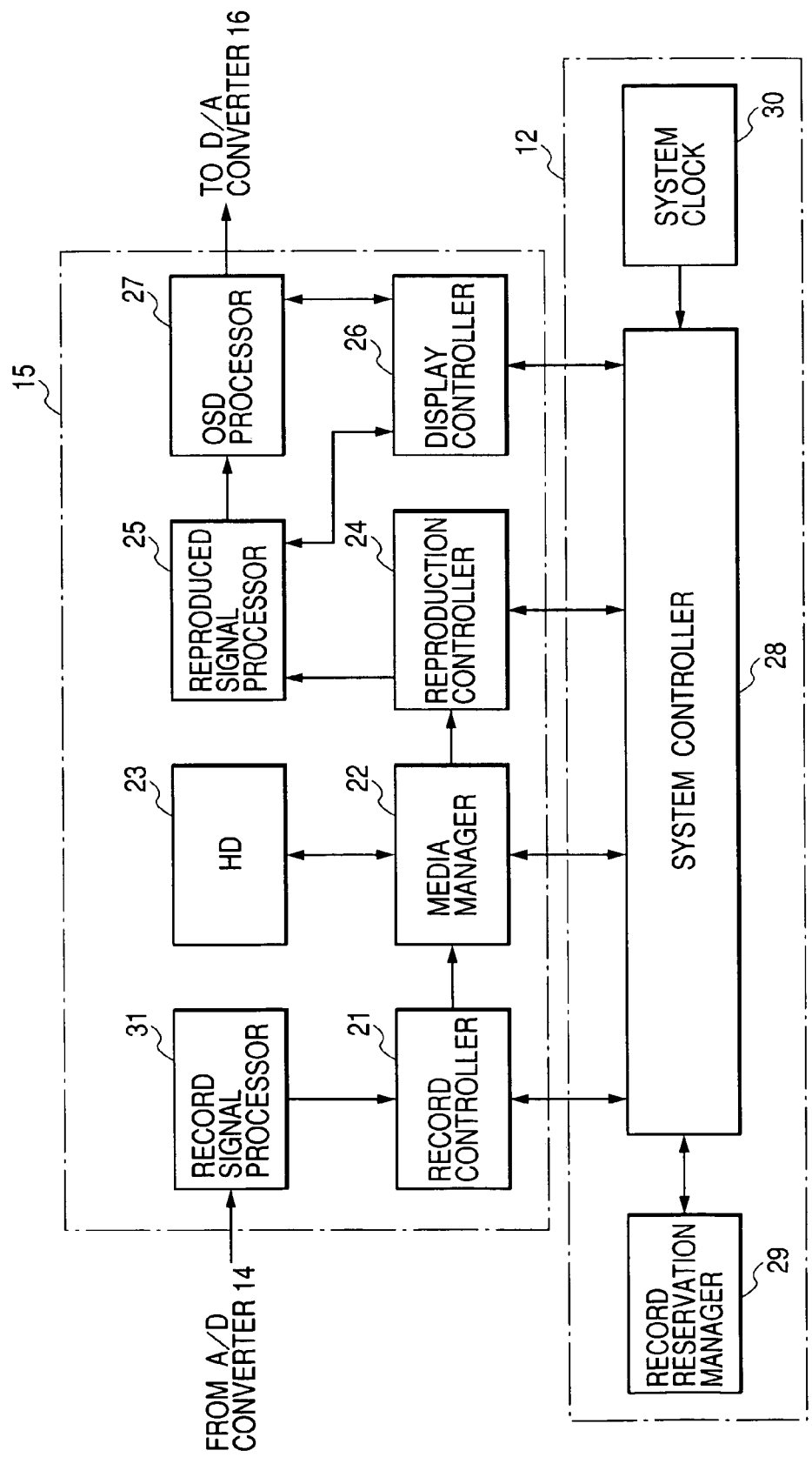
FIG. 2 is a block diagram of a CPU and an HDD in FIG. 1.

As shown in FIG. 2, the HDD 15 includes a record controller 21, a media manager 22, a hard disk 23, a reproduction controller 24, a reproduced signal processor 25, a display controller 26, an OSD (on-screen display) processor 27, and a record signal processor 31. The CPU 12 includes a system controller 28, a record reservation manager 29, and a system clock 30.

The record signal processor 31 follows the A/D converter 14. The record signal processor 31 is connected with the record controller 21. The record controller 21 is connected with the media manager 22 and the system controller 28. The media manager 22 can access the hard disk 23 which is a recording medium. The media manager 22 is connected with the reproduction controller 24 and the system controller 28. The reproduction controller 24 is connected with the reproduced signal processor 25 and the system controller 28. The reproduced signal processor 25 is connected with the display controller 26 and the OSD processor 27. The display controller 26 is connected with the OSD processor 27 and the system controller 28. The OSD processor 27 is followed by the D/A converter 16. The system controller 28 is connected with the record reservation manager 29 and the system clock 30. In addition, the system controller 28 is connected with the VTR 13, the switches 17 and 18, the display 19, and the remote control receiver 20b (see FIG. 1).

The record signal processor 31 receives the contents signal from the A/D converter 14. The record signal processor 31 includes a compressive encoder such as an MPEG encoder. Here, "MPEG" is short for Moving Picture Experts Group. The record signal processor 31 subjects the output signal of the A/D converter 14 to a compression process, for example, an MPEG-based compression process, to get the compression-resultant contents signal (the contents signal of the MPEG format). The record signal processor 31 outputs the compression-resultant contents signal to the record controller 21.

The record controller 21 adds auxiliary information to the compression-resultant contents signal. The record controller 21 stores the auxiliary-information-added contents signal into a buffer (not shown). The record controller 21 reads out the auxiliary-information-added contents signal from the buffer and outputs the read-out contents signal to the media manager 22 at a prescribed timing.

The media manager 22 converts the contents signal from the record controller 21 into a contents signal of a prescribed format suited for record on the hard disk 23. The media manager 22 can extract copyright management information and attribute information from the contents signal. The copyright management information and the attribute information relate to the program represented by the contents signal. The media manager 22 can output the copyright management information and the attribute information to the system controller 28. The media manager 22 includes an arrangement for accessing the hard disk 23. The media manager 22 records the prescribed-format contents signal on the hard disk 23. The media manager 22 can erase the recorded contents signal from the hard disk 23. The recording of a contents signal on the hard disk 23 and the erasure of another contents signal from the hard disk 23 can be alternately implemented by the media manager 22 on a time sharing basis. The media manager 22 reproduces the prescribed-format contents signal from the hard disk 23. The media manager 22 converts the reproduced contents signal into a contents signal of an original format equal to the format of a contents signal outputted from the record controller 21. The media manager 22 outputs the resultant contents signal to the reproduction controller 24.

The reproduction controller 24 stores the contents signal from the media manager 22 into a buffer (not shown). The reproduction controller 24 reads out the contents signal from the buffer and outputs the read-out contents signal to the reproduced signal processor 25 at a prescribed timing. In addition, the reproduction controller 24 extracts the auxiliary information from the contents signal. The reproduction controller 24 outputs the extracted auxiliary information to the system controller 28.

The reproduced signal processor 25 includes an expansive decoder such as an MPEG decoder. The reproduced signal processor 25 subjects the contents signal from the reproduction controller 24 to an expansion process, for example, an MPEG-based expansion process, to get the expansion-resultant contents signal. The expansion process is inverse with respect to the compression process by the record signal processor 31. The reproduced signal processor 25 outputs the expansion-resultant contents signal to the OSD processor 27. The expansion-resultant contents signal has a set of a video signal and an audio signal. The reproduction signal processor 25 generates a sync signal related to the video signal. The reproduction signal processor 25 outputs the sync signal to the display controller 26.

The OSD processor 27 adds on-screen information (OSI) to the contents signal outputted from the reproduced signal processor 25. In other words, the OSD processor 27 superimposes the on-screen information (OSI) on the contents signal outputted from the reproduced signal processor 25. The OSD processor 27 includes a VRAM (a video RAM or a frame memory). The VRAM is used in superimposing the on-screen information (OSI) on the contents signal. The OSD processor 27 outputs the OSI-added contents signal to the D/A converter 16. The display controller 26 controls the OSD processor 7 on the basis of a timing determined by the sync signal fed from the reproduced signal processor 25.

The record reservation manager 29 includes a memory storing information of program reservations (program recording reservations). The record reservation manager 29 sends and receives information to and from the system controller 28. The system clock 30 feeds information of the present date and information of the present time to the system controller 28.

The system controller 28 controls the record controller 21, the media manager 22, the reproduction controller 24, and the display controller 26 while sending and receiving information to and from the devices 21, 22, 24, and 26. The information sent from the system controller 28 to the display controller 26 has components corresponding to the on-screen information. In addition, the system controller 28 controls the VTR 13, the switches 17 and 18, and the display 19. The system controller 28 includes, for example, a microcomputer or a similar device having a combination of an input/output port, a processing section, a RAM, and a ROM. The system controller 28 operates in accordance with a control program stored in the ROM. The control program is designed to enable the system controller 28 to implement steps of operation which will be mentioned later.

The ROM or another memory in the system controller 28 stores image files and text data. The system controller 28 generates a signal representative of an HDD navigation picture of the GUI type and a signal representative of a VHS navigation picture (a VTR navigation picture) of the GUI type on the basis of the image files and the text data. Here, "GUI" is short for Graphical User Interface. The system controller 28 compresses the signal of the HDD navigation picture and the signal of the VHS navigation picture according to, for example, the JPEG (Joint Photographic Experts Group) standards. The system controller 28 outputs the compression-resultant signal of the HDD navigation picture and the compression-resultant signal of the VHS navigation picture to the media manager 22. The system controller 28 controls the media manager 22, thereby recording the compression-resultant signal of the HDD navigation picture and the compression-resultant signal of the VHS navigation picture on the hard disk 23.

As shown in FIG. 23, the hard disk 23 includes areas H31, H32, H33, H34, and H35. The area H31 stores contents signals (program signals) denoted by identification numbers #1, #2, . . . , and #N respectively. The area H31 is also referred to as the video contents area H31. The area H32 stores data representing a table indicating the correspondence relation between the program identification numbers #1, #2, . . . , and #N and the addresses on the video contents area H31 in the hard disk 23 where the program signals are recorded respectively. The addresses are composed of sector addresses and track addresses. The area H32 is also referred to as the program/HD correspondence table area H32. The area H33 stores HDD navigation data for the program signals #1, #2, . . . , and #N stored in the video contents area H31. For each of the program signals #1, #2, . . . , and #N, the HDD navigation data contain a thumbnail signal and also detailed information which represents a program title, a recording date, a recording channel, a recording time, a genre, and an icon or icons. The area H33 is also referred to as the HDD navigation data area H33. The area H34 stores VHS navigation data (VTR navigation data) for program signals #1, #2, . . . , and #M recorded on the magnetic tape in the VTR 13. For each of the program signals #1, #2, . . . , and #M, the VHS navigation data contain a thumbnail signal and also detailed information which represents a program title, a recording date, a recording channel, a recording time, a genre, and an icon or icons. The area H34 is also referred to as the VHS navigation data area H34. The area H35 stores data representing a table indicating the correspondence relation between the program identification numbers #1, #2, . . . , and #M and the addresses where the program signals are recorded respectively. The addresses are composed of tape identification numbers and tape positions. The area H35 is also referred to as the program/tape correspondence table area H35.

Operation of the apparatus 10 can be changed among various modes in response to command signals inputted via the remote control transmitter 20a. The modes of operation of the apparatus include an HDD recording mode, an HDD playback mode, an HDD navigation mode, a VHS recording mode (a VTR recording mode), a VHS playback mode (a VTR playback mode), a VHS navigation mode (a VTR navigation mode), a normal dubbing mode, a continuous dubbing mode, and a midnight dubbing mode.

The HDD recording mode of operation of the apparatus 10 is started when a record command signal is inputted into the system controller 28 via the remote control transmitter 20a and the remote control receiver 20b. During the HDD recording mode of operation of the apparatus 10, the switch 17 is controlled by the system controller 28 to select designated one among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the selected contents signal to the A/D converter 14. The A/D converter 14 changes the selected contents signal into a corresponding digital contents signal. The A/D converter 14 outputs the digital contents signal to the record signal processor 31. The record signal processor 31 converts the output signal of the A/D converter 14 into a compressed contents signal of the MPEG format. The record signal processor 31 outputs the MPEG contents signal to the record controller 21. On the other hand, the system controller 28 receives the present-date information and the present-time information from the system clock 30. The system controller 28 transfers the present-date information and the present-time information to the record controller 21. The record controller 21 generates program identification number information and frame information related to the MPEG contents signal. The record controller 21 combines the present-date information, the present-time information, the program identification number information, and the frame information into auxiliary information. The record controller 21 adds the auxiliary information to the MPEG contents signal. The added auxiliary information is equivalent to information of the broadcasting time or the on-air time (the on-air time stamp) of the contents signal. The record controller 21 has an internal buffer. The record controller 21 stores the auxiliary-information-added contents signal into the internal buffer.

During the HDD recording mode of operation of the apparatus 10, the record controller 21 is controlled by the system controller 28 so that the auxiliary-information-added contents signal is read out from the buffer in the record controller 21 and is outputted to the media manager 22. The media manager 22 is controlled by the system controller 28, thereby converting the contents signal from the record controller 21 into a contents signal of the prescribed format suited for record on the hard disk 23. The media manager 22 records the prescribed-format contents signal on the video contents area H31 in the hard disk 23 while being controlled by the system controller 28. The contents signal recorded on the hard disk 23 contains the auxiliary information. Under the control by the system controller 28, the media manager 22 generates program-related information which represents the relation between the added auxiliary information and the address on the video contents area H31 in the hard disk 23 at which the recorded contents signal is located. Specifically, the media manager 22 generates table information indicating the correspondence relation between the program identification number and the address on the video contents area H31 in the hard disk 23 at which the recorded contents signal is located. The media manager 22 records the table information on the area H32 in the hard disk 23.

During the HDD recording mode of operation of the apparatus 10, the system controller 28 receives, from the media manager 22, a signal representing a picture in a program represented by the contents signal which occurs at the start of the recording of the program (the contents signal). The system controller 28 converts the signal representative of the program start picture into a signal indicative of a thumbnail. On the basis of the present-date information and the present-time information outputted from the system clock 30 and also command signals fed via the remote control receiver 20b, the system controller 28 generates detailed program-related information which represents a program title, a recording date, a recording channel, a recording time, a genre, and an icon or icons. The system controller 28 combines the thumbnail signal and the detailed program-related information into HDD navigation data. The system controller 28 outputs the HDD navigation data to the media manager 22. The system controller 28 controls the media manager 22, thereby recording the HDD navigation data on the area H33 in the hard disk 23.

During the HDD recording mode of operation of the apparatus 10, a plurality of program signals (contents signals) can be sequentially recorded on the video contents area H31 in the hard disk 23. For each of the recorded programs, table information is recorded on the area H32 in the hard disk 23 while HDD navigation data are recorded on the area H33 therein.

In general, the system controller 28 is informed of a designated program signal (a designated contents signal) via the remote control transmitter 20a and the remote control receiver 20b when the apparatus 10 is required to operate in the HDD playback mode. The system controller 28 notifies the media manager 22 of the designated program signal. The HDD playback mode of operation of the apparatus 10 is started when a playback command signal is inputted into the system controller 28 via the remote control transmitter 20a and the remote control receiver 20b. Specifically, in response to the playback command signal, the system controller 28 controls the media manager 22 to access the program/HD correspondence table in the area H32 of the hard disk 23. Under the control by the system controller 28, the media manager 22 refers to the program/HD correspondence table and searches the addresses in the table for one corresponding to the designated program signal (the designated contents signal). In addition, the media manager 22 accesses the search-result address on the video contents area H31 in the hard disk 23, and thereby reproduces the designated program signal (the designated contents signal) therefrom. Under the control by the system controller 28, the media manager 22 converts the reproduced contents signal into a contents signal of an original format equal to the format of a contents signal outputted from the record controller 21. The media manager 22 outputs the resultant contents signal to the reproduction controller 24. The reproduction controller 24 has an internal buffer. The reproduction controller 24 stores the contents signal from the media manager 22 into the internal buffer. Under the control by the system controller 28, the reproduction controller 24 reads out the contents signal from the internal buffer. The reproduction controller 24 extracts the auxiliary information from the read-out contents signal.

During the HDD playback mode of operation of the apparatus 10, the reproduction controller 24 outputs the read-out contents signal to the reproduced signal processor 25. In addition, the reproduction controller 24 outputs the extracted auxiliary information to the system controller 28. The reproduced signal processor 25 subjects the contents signal from the reproduction controller 24 to the expansion process, for example, the MPEG-based expansion process, to get the expansion-resultant contents signal. The reproduced signal processor 25 outputs the expansion-resultant contents signal to the OSD processor 27. The expansion-resultant contents signal has a set of a video signal and an audio signal. The reproduction signal processor 25 generates a sync signal related to the video signal. The reproduction signal processor 25 outputs the sync signal to the display controller 26. The system controller 28 transfers the auxiliary information from the reproduction controller 24 to the display controller 26. The display controller 26 controls the OSD processor 27 in response to the sync signal from the reproduced signal processor 25 and the auxiliary information from the system controller 28 so that the OSD processor 27 adds suitable on-screen information (OSI) to the contents signal outputted from the reproduced signal processor 25. The on-screen information originates from the auxiliary information. The OSD processor 27 outputs the OSI-added contents signal to the D/A converter 16. The D/A converter 16 changes the output signal of the OSD processor 27 into an analog OSI-added contents signal. The D/A converter 16 outputs the analog OSI-added contents signal to the switch 18. The switch 18 is controlled by the system controller 28, transmitting the analog OSI-added contents signal to the television receiver 1. A video signal in the analog OSI-added contents signal is indicated on the display of the television receiver 1 while an audio signal therein is converted into corresponding sounds by the loudspeakers of the television receiver 1.

During the HDD playback mode of operation of the apparatus 10, a plurality of designated program signals (designated contents signals) can be sequentially reproduced from the video contents area H31 in the hard disk 23. In this case, the addresses in the program/HD correspondence table are searched for ones corresponding to the designated program signals.

The normal dubbing mode of operation of the apparatus 10 is started in response to a corresponding command signal inputted via the remote control transmitter 20a. In connection with the normal-dubbing command signal, the system controller 28 is informed of a program requested to be dubbed. During the normal dubbing mode of operation of the apparatus 10, the system controller 28 controls the media manager 22 in response to the normal-dubbing command signal and the requested-program information, thereby finding the requested program by reference to the program/HD correspondence table in the area H32 of the hard disk 23 and reproducing the contents signal representative of the requested program from the video contents area H31 of the hard disk 23. The reproduced contents signal is transmitted from the media manager 22 to the D/A converter 16 via the reproduction controller 24, the reproduced signal processor 25, and the OSD processor 27. The D/A converter 16 changes the reproduced contents signal into an analog contents signal representative of the requested program. The D/A converter 16 outputs the analog contents signal to the switch 17. The switch 17 passes the output signal of the D/A converter 16 to the VTR 13 while being controlled by the system controller 28. The VTR 13 records the incoming contents signal on the magnetic tape while being controlled by the system controller 28. Thus, the requested program is dubbed onto the magnetic tape.

During the normal dubbing mode of operation of the apparatus 10, the system controller 28 detects the program identification number from the requested-program information. The system controller 28 receives, from the VTR 13, information representing the address where the dubbed contents signal (the dubbed program signal) is located. The address is composed of the tape identification number and the tape position. The system controller 28 informs the media manager 22 of the detected program identification number and the address where the dubbed contents signal is located. Under the control by the system controller 28, the media manager 22 generates table information indicating the correspondence relation between the program identification number and the address where the dubbed contents signal is located. The media manager 22 records the table information on the area H35 in the hard disk 23.

During the normal dubbing mode of operation of the apparatus 10, the system controller 28 controls the media manager 22 to access the HDD navigation data area H33 in the hard disk 23. Under the control by the system controller 28, the media manager 22 reads, from the area H33 in the hard disk 23, the HDD navigation data corresponding to the detected program identification number. Then, the media manager 22 copies or records the read HDD navigation data onto the area H34 in the hard disk 23 as VHS navigation data (VTR navigation data) for the dubbed contents signal denoted by the detected program identification number.

The continuous dubbing mode and midnight dubbing mode of operation of the apparatus 10 are similar to the normal dubbing mode of operation thereof except for the following points. During the continuous dubbing mode of operation of the apparatus 10, a plurality of requested programs is continuously dubbed from the hard disk 23 onto the magnetic tape in the VTR 13. In this case, the area H35 in the hard disk 23 is loaded with table information indicating the correspondence relation between the program identification numbers and the addresses where the dubbed contents signals are located. Furthermore, HDD navigation data corresponding to the dubbed contents signals are copied from the area H33 of the hard disk 23 onto the area H34 thereof as VHS navigation data (VTR navigation data) for the dubbed contents signals. The midnight dubbing mode of operation of the apparatus 10 is automatically executed during a preset time range.

When the navigation button (the end button) on the remote control transmitter 20*a* is depressed, a corresponding command signal (a navigation command signal) is transmitted from the remote control transmitter 20*a* to the system controller 28 via the remote control receiver 20*b*. The system controller 28 controls the media manager 22 in response to the navigation command signal, thereby reproducing the compression-resultant signal of the HDD navigation picture or the compression-resultant signal of the VHS navigation picture from the hard disk 23. When the navigation command signal relates to the HDD navigation, the compression-resultant signal of the HDD navigation picture is reproduced. On the other hand, when the navigation command signal relates to the VHS navigation, the compression-resultant signal of the VHS navigation picture is reproduced. The system controller 28 expands the reproduced signal of the HDD navigation picture or the reproduced signal of the VHS navigation picture. The system controller 28 outputs the expansion-resultant signal of the HDD navigation picture or the expansion-resultant signal of the VHS navigation picture to the reproduction controller 24. The reproduction controller 24 and the switch 18 are controlled by the system controller 28 so that the signal of the HDD navigation picture or the signal of the VHS navigation picture can be transmitted from the reproduction controller 24 to the television receiver 1 via the reproduced signal processor 25, the OSD processor 27, the D/A converter 16, and the switch 18. Accordingly, the HDD navigation picture or the VHS navigation picture can be indicated on the display of the television receiver 1. In addition, the system controller 28 controls the media manager 22, thereby reproducing the thumbnail signals from the hard disk 23. When the navigation command signal relates to the HDD navigation, the thumbnail signals for the HDD navigation are reproduced. On the other hand, when the navigation command signal relates to the VHS navigation, the thumbnail signals for the VHS navigation are reproduced. The system controller 28 transfers the thumbnail signals from the media manager 22 to the display controller 26. The display controller 26 feeds the thumbnail signals to the OSD processor 27. The OSD processor 27 superimposes the thumbnail signals on the signal of the HDD navigation picture or the signal of the VHS navigation picture. Thus, the HDD navigation picture or the VHS navigation picture indicated on the display of the television receiver 1 have the thumbnails at prescribed display positions respectively. Furthermore, the system controller 28 controls the media manager 22, thereby reproducing the detailed program-related information from the hard disk 23. When the navigation command signal relates to the HDD navigation, the detailed program-related information for the HDD navigation is reproduced. On the other hand, when the navigation command signal relates to the VHS navigation, the detailed program-related information for the VHS navigation is reproduced. The system controller 28 transfers the detailed program-related information from the media manager 22 to the display controller 26. The display controller 26 feeds the detailed program-related information to the OSD processor 27. The OSD processor 27 superimposes the detailed program-related information on the signal of the HDD navigation picture or the signal of the VHS navigation picture. Thus, the HDD navigation picture or the VHS navigation picture indicated on the display of the television receiver 1 have portions corresponding to the detailed program-related information.

Figure 4:
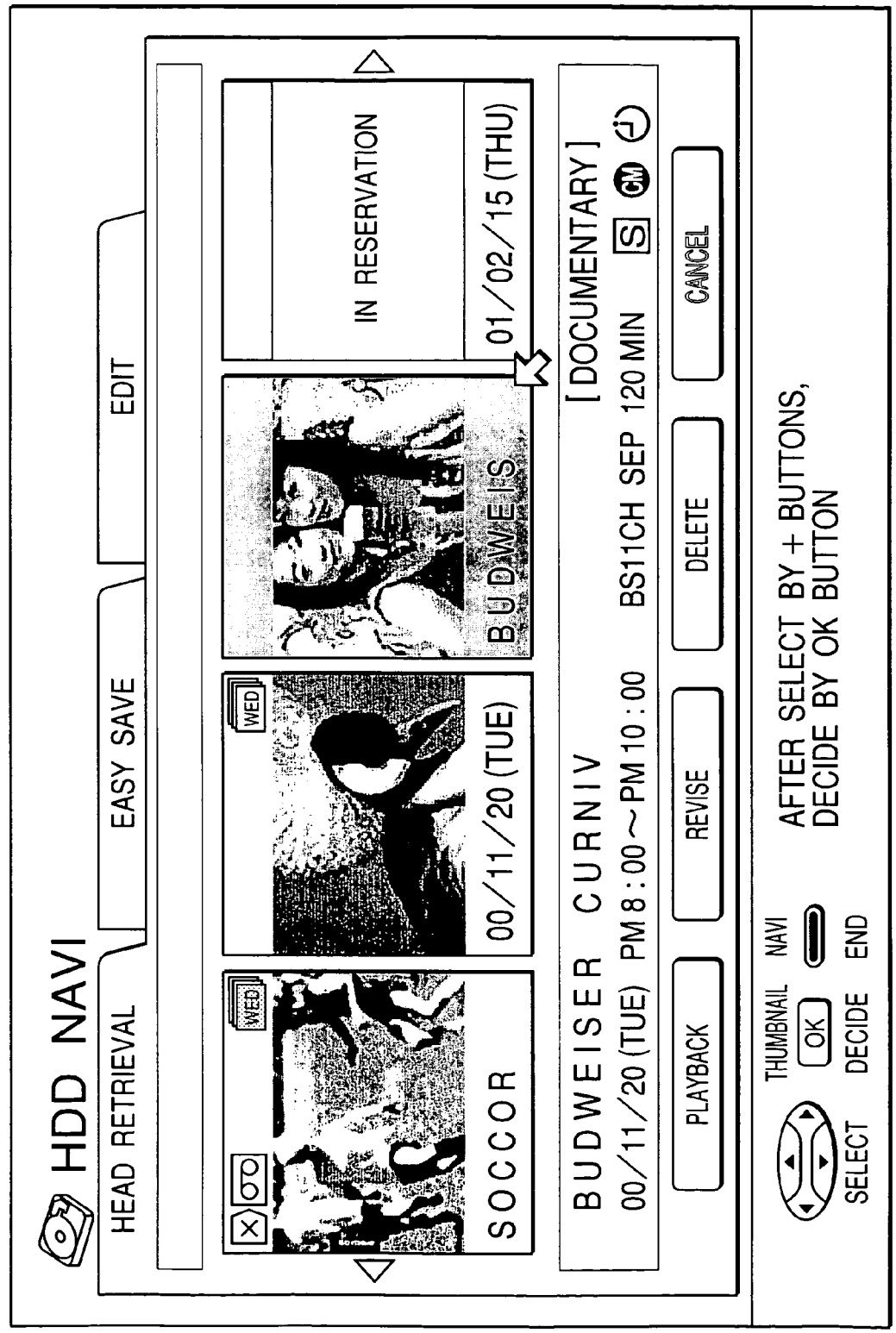
FIG. 4 is a diagram of an example of a head retrieval page in an HDD navigation picture.
Figure 5:
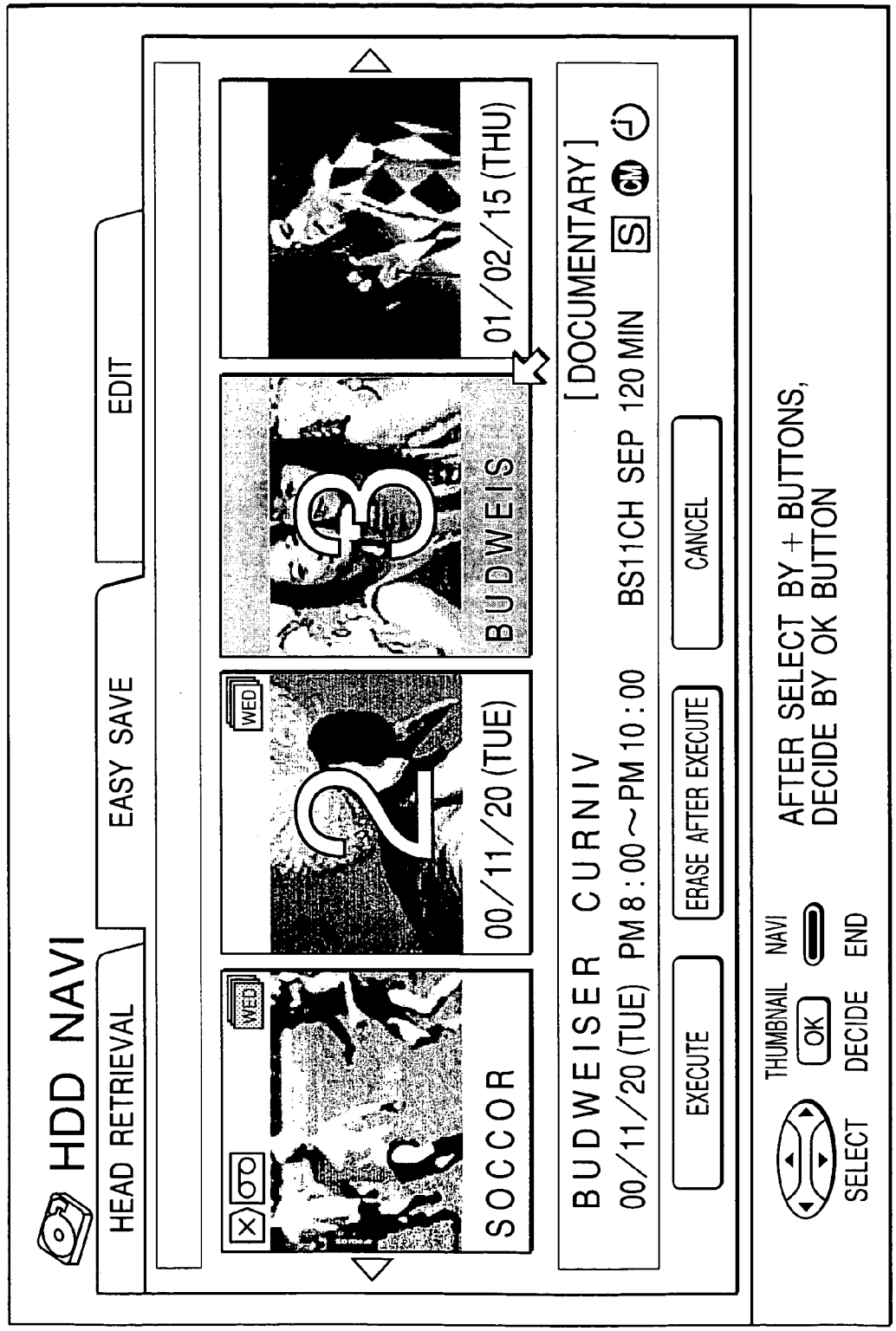
FIG. 5 is a diagram of an example of an easy save page in the HDD navigation picture.

The HDD navigation picture has three basic pages, that is, a head retrieval page, an easy save page, and an editing page. The head retrieval page is designed for retrieving the heads of the respective recorded contents (the respective recorded programs) on the hard disk 23. An example of the head retrieval page is shown in FIG. 4. The easy save page is designed for copying or dubbing a contents signal (a program) from the hard disk 23 onto the magnetic tape in the VTR 13. An example of the easy save page is shown in FIG. 5. Each of the head retrieval page, the easy save page, and the editing page has a set of thumbnails at prescribed display positions respectively. Each of the head retrieval page, the easy save page, and the editing page includes three tags corresponding to the three basic pages respectively. Any one of the head retrieval page, the easy save page, and the editing page is selected and indicated by designating the corresponding tag. Detailed pages are linked with each of the three basic pages. A deletion-related page is an example of one of the detailed pages.

A lower area of every page of the HDD navigation picture and the VHS navigation picture indicates a guidance as to operation of the "+"-arranged cursor-moving selection buttons, the decision (OK) button, and the end (navigation) button on the remote control transmitter 20*a*. Every page of the HDD navigation picture and the VHS navigation picture has a cursor. By operating the "+"-arranged cursor-moving selection buttons, the cursor is moved among limited positions including button positions and tag positions according to a GUI picture.

The apparatus 10 has an HDD navigation function corresponding to the HDD navigation mode of operation. The features of the HDD navigation function are as follows.

(A1) Navigation data are recorded on the area H33 in the hard disk: 23.

(A2) The maximum number of registered programs (registered programs represented by the contents signals) subjected to navigation is equal to 60.

(A3) Program genres are of 12 to 16 types prescribed by BS digital broadcasting.

(A4) Each program title is denoted by at most 15 alphanumeric letters or characters.

(A5) A program picture which occurs at the start of the recording of a program is registered as a thumbnail. A program in reservation is denoted by the message "in reservation" placed in the last one among picture sections for the thumbnails. The message "in reservation" may be replaced by a previously-registered picture portion indicative of "in reservation". Regarding the reservation-based recording of a program of less than 5 minutes, a program picture occurring at the start of the recording is registered as a thumbnail. Regarding the reservation-based recording of a program of 5 minutes or longer, a program picture occurring at the start of the recording is registered as a thumbnail, and the thumbnail is updated to a program picture occurring 5 minutes thereafter. Specifically, the system controller 28 generates a signal indicative of a thumbnail on the basis of a program picture which occurs at the start of the recording of a program. The system controller 28 records the thumbnail signal on the HDD navigation data area H33 in the hard disk 23 via the media manager 22. In the case of the reservation-based recording of a program, the system controller 28 starts a timer for measuring the lapse of time. When the timer indicates that 5 minutes have elapsed, the system controller 28 generates a signal indicative of a new thumbnail on the basis of the present program picture. The system controller 28 writes the new thumbnail signal over the old one on the HDD navigation data area H33 in the hard disk 23 via the media manager 22.

(A6) Every registered thumbnail can be replaced by revised one.

(A7) When a thumbnail is designated by the cursor, detailed information related to the thumbnail is indicated in a picture portion below the thumbnail. The detailed information represents a program title, a recording date, a recording channel, a recording time, a genre, and an icon or icons.

(A8) A playback button, a revise button, a deletion button, and a cancel button are indicated in a picture area below the detailed information.

The apparatus 10 has a head-retrieval-page indicating function regarding the HDD navigation picture. The features of the head-retrieval-page indicating function are as follows.

(B1) When the end (navigation) button on the remote control transmitter 20*a* is depressed under the conditions where the power supply to the apparatus 10 is in an on state, the head retrieval page of the HDD navigation picture is indicated on the display of the television receiver 1. The cursor initially points to the thumbnail corresponding to the latest recorded program. The cursor can be moved among the thumbnails in accordance with operation of the "+"-arranged cursor-moving selection buttons on the remote control transmitter 20*a*. The thumbnails can be scrolled in accordance with operation of the "+"-arranged cursor-moving selection buttons.

(B2) The thumbnails are indicated in the order corresponding to the order of the recording of the related programs. A program in reservation is denoted by the message "in reservation" placed in the last one among picture sections for the thumbnails.

(B3) When the decision (OK) button on the remote control transmitter 20*a* is depressed under the conditions where one of the thumbnails is designated by the cursor, the cursor is moved to the playback button in the indicated picture. When the decision (OK) button is depressed, the program corresponding to the thumbnail designated by the cursor starts to be played back.

(B4) In the case where the continuous playback of a plurality of programs is requested, when one of the thumbnails is designated by the cursor and the memory button on the remote control transmitter 20*a* is depressed, the playback order number of the program corresponding to the designated thumbnail is registered, and is indicated on the designated thumbnail as shown in FIG. 5. In the case where the thumbnail remains designated by the cursor, when the memory button on the remote control transmitter 20*a* is depressed again, the playback order number is erased from the thumbnail to notify "canceled". On the other hand, in the case where the decision (OK) button on the remote control transmitter 20*a* is depressed after the cursor is moved to the playback button in the indicated picture, the continuous playback of a plurality of programs is started. Specifically, the system controller 28 assigns playback-order serial numbers to the requested programs in response to the command signals fed via the remote control transmitter 20*a*. The system controller 28 loads an internal memory with information representing the assignment of the playback-order serial numbers to the request programs. The system controller 28 informs the OSD processor 27 of the assigned playback-order serial numbers via the display controller 26. The OSD processor 27 superimposes the playback-order serial numbers over the corresponding thumbnails respectively. Under the control by the system controller 28, the media manager 22 sequentially reproduces the requested programs from the hard disk 23 in the order corresponding to the order determined by the assigned playback-order serial numbers.

The apparatus 10 has an easy-save-page indicating function regarding the HDD navigation picture. The features of the easy-save-page indicating function are as follows.

(C1) When the decision (OK) button on the remote control transmitter 20*a* is depressed under the conditions where the easy save tag is designated by the cursor, the easy save page of the HDD navigation picture is indicated on the display of the television receiver 1. An example of the easy save page is shown in FIG. 5. The contents of the easy save page are substantially similar to those of the head retrieval page except for buttons of "execute", "erase-after-execute", "cancel", and "midnight".

(C2) The thumbnails are indicated in the order corresponding to the order of the recording of the related programs.

(C3) When the decision (OK) button on the remote control transmitter 20*a* is depressed under the conditions where one of the thumbnails is designated by the cursor, the cursor is moved to the "execute" button in the indicated picture. When the decision (OK) button is depressed under the conditions where the "execute" button or the "erase-after-execute" button is designated by the cursor, a tape insertion message is indicated. When the decision (OK) button is depressed then, the program corresponding to the designated thumbnail starts to be dubbed from the hard disk 23 onto the magnetic tape in the VTR 13.

(C4) In the case where the continuous dubbing of a plurality of programs is requested, when one of the thumbnails is designated by the cursor and the memory button on the remote control transmitter 20*a* is depressed, the dubbing order number of the program corresponding to the designated thumbnail is registered, and is indicated on the designated thumbnail as shown in FIG. 5. In the case where the thumbnail remains designated by the cursor, when the memory button on the remote control transmitter 20*a* is depressed again, the dubbing order number is erased from the thumbnail to notify "canceled". On the other hand, in the case where the decision (OK) button on the remote control transmitter 20*a* is depressed after the cursor is moved to the "execute" button or the "erase-after-execute" button in the indicated picture, the continuous dubbing of a plurality of programs is started. Specifically, the system controller 28 assigns dubbing-order serial numbers to the requested programs in response to the command signals fed via the remote control transmitter 20a. The system controller 28 loads the internal memory with information representing the assignment of the dubbing-order serial numbers to the request programs. The system controller 28 informs the OSD processor 27 of the assigned dubbing-order serial numbers via the display controller 26. The OSD processor 27 superimposes the dubbing-order serial numbers over the corresponding thumbnails respectively. Under the control by the system controller 28, the media manager 22 sequentially reproduces the requested programs from the hard disk 23 in the order corresponding to the order determined by the assigned dubbing-order serial numbers. During the continuous dubbing of the programs, the HDD 15 reproduces the programs, and the reproduced programs are fed to the switch 17 via the D/A converter 16. The switch 17 is controlled by the system controller 28 to transmit the reproduced programs to the VTR 13. The reproduced programs are sequentially dubbed onto the magnetic tape in the VTR 13 in the order determined by the assigned dubbing-order serial numbers.

(C5) In the case where the "execute" button is selected at the time of the completion of the dubbing, the original program or programs are left in the hard disk 23. In addition, the thumbnail signal or signals corresponding to the dubbed program or programs are copied from the HDD navigation data area H33 of the hard disk 23 onto the VHS navigation data area H34 thereof. The thumbnail signal or signals remain in the HDD navigation data area H33. In the case where the "erase-after-execute" button is selected at the time of the completion of the dubbing, the original program or programs are erased from the hard disk 23. In addition, the thumbnail signal or signals corresponding to the dubbed program or programs are moved from the HDD navigation data area H33 of the hard disk 23 onto the VHS navigation data area H34 thereof. The thumbnail signal or signals are erased from the HDD navigation data area H33. In the event that the dubbing has failed, the original program or programs are prevented from being erased from the hard disk 23. Also, the thumbnail signal or signals are prevented from being erased from the HDD navigation data area H33.

(C6) Designating the "midnight" button by the cursor results in the execution of the midnight dubbing mode of operation of the apparatus 10. In this case, the dubbing of a program is automatically executed during a preset time range (for example, from 2 a.m. to 5 a.m.). A midnight dubbing button for commanding midnight dubbing may be provided on the remote control transmitter 20a in place of or in addition to the "midnight" button on the easy save page.

The apparatus 10 has a VHS navigation function corresponding to the VHS navigation mode of operation. The features of the VHS navigation function are as follows.

(D1) Navigation data are recorded on the area H34 in the hard disk 23. The area H33 may be used instead of the area H34 to save a used capacity of the hard disk 23. In this case, regarding each of programs, a flag is added which indicates whether navigation data are used for HDD navigation only or both HDD navigation and VHS navigation.

(D2) The maximum number of registered magnetic tapes is equal to 680. The maximum number of registered programs (registered programs represented by the contents signals) subjected to navigation is equal to 2,000 in title.

(D3) Program genres are of 12 to 16 types prescribed by BS digital broadcasting.

(D4) Each program title is denoted by at most 15 alphanumeric letters or characters.

(D5) A program picture which occurs at the start of the recording of a program is registered as a thumbnail. In the case of the dubbing of a program signal from the hard disk 23 onto the magnetic tape of the VTR 13, a corresponding thumbnail signal is copied or moved from the HDD navigation data area H33 in the hard disk 23 to the VHS navigation data area H34 therein. Regarding the reservation-based recording of a program of less than 5 minutes, a program picture occurring at the start of the recording is registered as a thumbnail. Regarding the reservation-based recording of a program of 5 minutes or longer, a program picture occurring at the start of the recording is registered as a thumbnail, and the thumbnail is updated to a program picture occurring 5 minutes thereafter. When the HDD 15 is recording or playing back a program signal, the registration of a thumbnail for VHS navigation is inhibited. In this case, apart from the previously-mentioned copy or move, "thumbnail non-registered" is displayed on a thumbnail position.

(D6) Every registered thumbnail can be replaced by revised one. In other words, every registered thumbnail can be updated. Specifically, thumbnail signals are read out from the hard disk 23 before being indicated on the display of the television receiver 1. The user can designate one among the indicated thumbnails by operating the remote control transmitter 20a. The contents signal (the program signal) corresponding to the designated thumbnail is read out from the hard disk 23 before being indicated as a moving picture on a part of the screen of the display of the television receiver 1. The user can designate a thumbnail capture moment by operating the remote control transmitter 20a. At the designated thumbnail capture moment, the present picture represented by the indicated contents signal is sampled (captured) as a still picture, and the sampled still picture is indicated on another part of the screen of the display of the television receiver 1. The sampled still picture constitutes a new thumbnail. A signal representative of the new thumbnail is recorded on the hard disk 23 while replacing the old thumbnail signal thereon.

(D7) When a thumbnail is designated by the cursor, detailed information related to the thumbnail is indicated in a picture portion below the thumbnail. The detailed information represents a program title, a recording date, a recording channel, a recording time, a genre, and an icon or icons.

Figure 6:
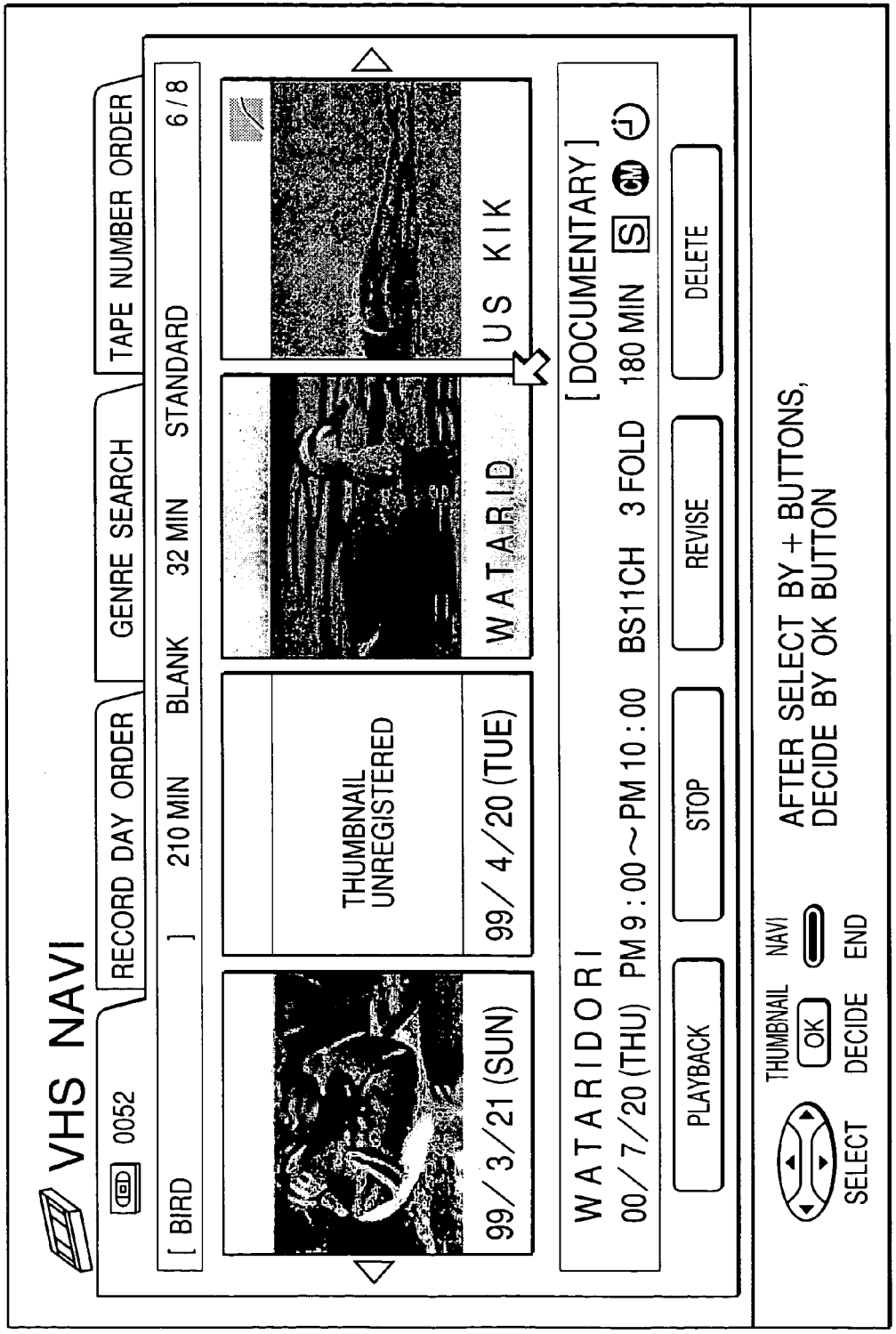
FIG. 6 is a diagram of an example of a head retrieval page in a VHS navigation picture.

The VHS navigation picture has four basic pages, that is, a head retrieval page, a record day order page, a genre search page, and a tape number order page. The head retrieval page is designed for retrieving the heads of the respective recorded contents (the respective recorded programs) on the magnetic tape. An example of the head retrieval page in the VHS navigation picture is shown in FIG. 6. Each of the head retrieval page, the record day order page, the genre search page, and the tape number order page includes four tags corresponding to the four basic pages respectively. Any one of the head retrieval page, the record day order page, the genre search page, and the tape number order page is selected and indicated by designating the corresponding tag and then depressing the decision (OK) button. In the head retrieval page, a set of four digits indicating the tape identification number is indicated on a region for the head-retrieval-page tag. During the first recording of information on the magnetic tape, a signal representative of the tape identification number is recorded on the control track.

Detailed pages are linked with each of the four basic pages of the VHS navigation picture.

The apparatus 10 has a head-retrieval-page indicating function regarding the VHS navigation picture. The features of the head-retrieval-page indicating function are as follows.

(E1) When the end (navigation) button on the remote control transmitter 20a is depressed under the conditions where the power supply to the apparatus 10 is in an on state and the operation of the apparatus 10 is in the VHS mode, the head retrieval page of the VHS navigation picture is indicated on the display of the television receiver 1. The cursor initially points to the thumbnail corresponding to the latest recorded program. The cursor can be moved among the thumbnails in accordance with operation of the "+"-arranged cursor-moving selection buttons on the remote control transmitter 20a. The thumbnails can be scrolled in accordance with operation of the "+"-arranged cursor-moving selection buttons.

(E2) The thumbnails are indicated in the order corresponding to the order of the recording of the related programs. A program in reservation is denoted by the message "in reservation" placed in the last one among picture sections for the thumbnails.

(E3) When the decision (OK) button on the remote control transmitter 20a is depressed under the conditions where one of the thumbnails is designated by the cursor, the cursor is moved to the playback button in the indicated picture. When the decision (OK) button is depressed, the program corresponding to the thumbnail designated by the cursor starts to be played back.

(E4) In the case where the continuous playback of a plurality of programs is requested, when one of the thumbnails is designated by the cursor and the memory button on the remote control transmitter 20a is depressed, the playback order number of the program corresponding to the designated thumbnail is registered, and is indicated on the designated thumbnail in a way similar to that shown in FIG. 5. In the case where the thumbnail remains designated by the cursor, when the memory button on the remote control transmitter 20a is depressed again, the playback order number is erased from the thumbnail to notify "canceled". On the other hand, in the case where the decision (OK) button on the remote control transmitter 20a is depressed after the cursor is moved to the playback button in the indicated picture, the continuous playback of a plurality of programs is started. Specifically, the system controller 28 assigns playback-order serial numbers to the requested programs in response to the command signals fed via the remote control transmitter 20a. The system controller 28 loads the internal memory with information representing the assignment of the playback-order serial numbers to the request programs. The system controller 28 informs the OSD processor 27 of the assigned playback-order serial numbers via the display controller 26. The OSD processor 27 superimposes the playback-order serial numbers over the corresponding thumbnails respectively. Under the control by the system controller 28, the VTR 13 sequentially reproduces the requested programs from the magnetic tape in the order corresponding to the order determined by the assigned playback-order serial numbers.

Figure 7:
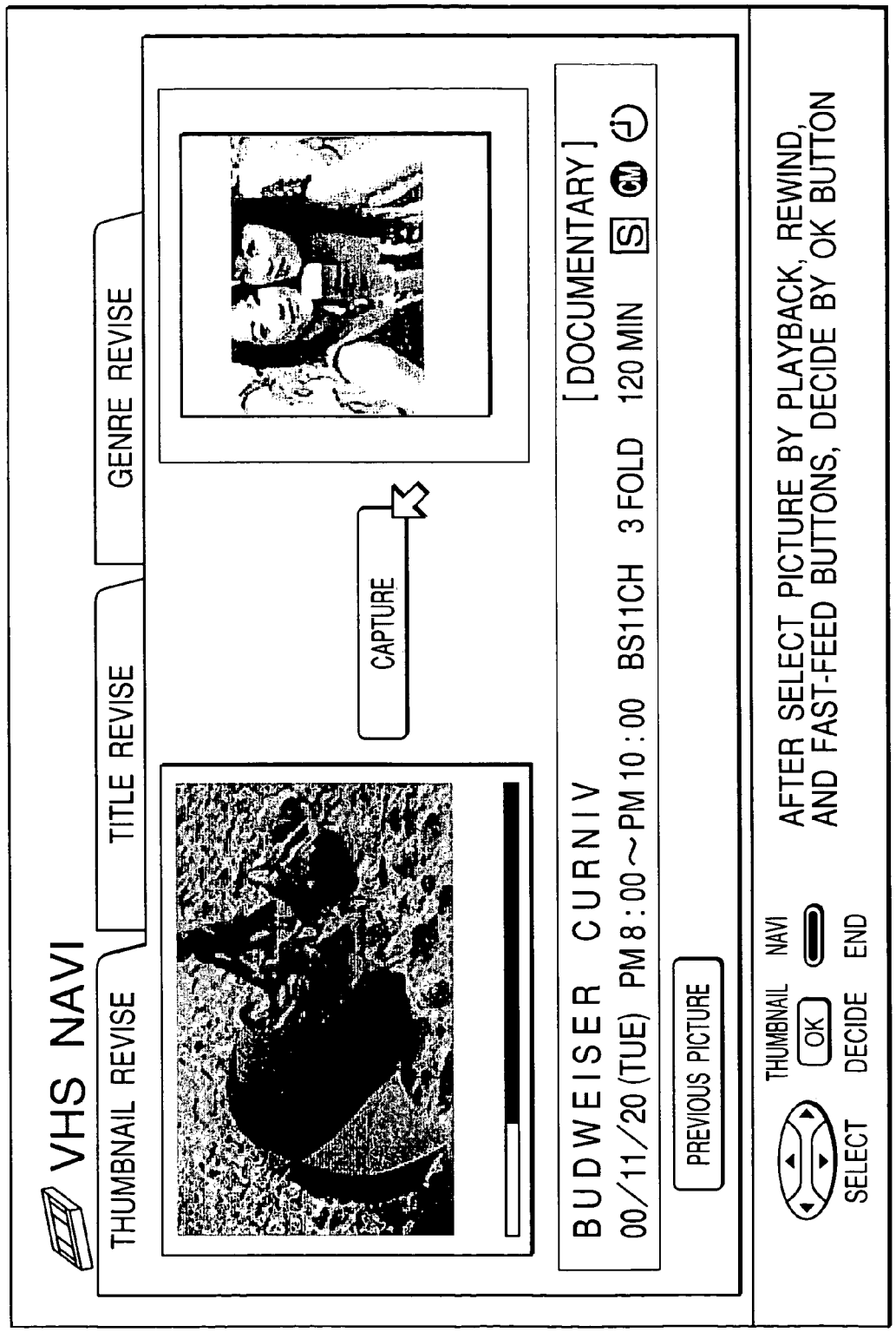
FIG. 7 is a diagram of an example of a thumbnail revision picture for VHS navigation.

Every registered thumbnail for the VHS navigation can be revised or updated as follows. When the decision (OK) button on the remote control transmitter 20a is depressed under the conditions where one of thumbnails in the head retrieval page of the VHS navigation picture is designated by the cursor, the cursor is moved to the playback button. In the case where the cursor is moved from the playback button to the revise button and then the decision (OK) button on the remote control transmitter 20a is depressed, a thumbnail revision picture for the VHS navigation (a thumbnail revision page in the VHS navigation picture) is indicated on the display of the television receiver 1. An example of the thumbnail revision picture for the VHS navigation is shown in FIG. 7. The thumbnail revision picture has a left-hand window for displaying a picture represented by a currently-reproduced contents signal (a currently-reproduced program signal), and a right-hand window for displaying a registered thumbnail corresponding to the currently-reproduced contents signal. Specifically, a thumbnail signal of interest is reproduced from the hard disk 23 before being displayed on the right-hand window of the thumbnail revision picture. On the other hand, a program signal of interest is reproduced by the VTR 13, and is then fed to the switch 17. Under the control by the system controller 28, the switch 17 transmits the reproduced program signal to the A/D converter 14. The reproduced program signal is fed to the HDD 15 via the A/D converter 14. The reproduced program signal is transmitted to the media manager 22 via the record signal processor 31 and the record controller 21. The media manager 22 records the reproduced program signal on the hard disk 23 while being controlled by the system controller 28. Then, the media manager 22 reproduces the recorded program signal from the hard disk 23. The reproduced program signal is transmitted from the media manager 22 to the switch 18 via the reproduction controller 24, the reproduced signal processor 25, the OSD processor 27, and the D/A converter 16. Under the control by the system controller 28, the switch 18 transmits the reproduced program signal to the television receiver 1. The reproduced program signal is displayed on the left-hand window of the thumbnail revision picture.

In the case where the thumbnail revision picture for the VHS, navigation is indicated, when a playback button, a rewinding button, or a fast-feed button on the remote control transmitter 20a is operated, a corresponding program signal is reproduced from the magnetic tape in the VTR 13 in accordance with the button operation. The reproduced program signal is displayed on the left-hand window of the thumbnail revision picture. When the decision (OK) button on the remote control transmitter 20a is depressed under the conditions where a capture button in the thumbnail revision picture is designated by the cursor, the present picture represented by the displayed program signal is sampled (captured) as a new thumbnail. A signal indicative of the new thumbnail is written over the old thumbnail signal on the VHS navigation data area H34 of the hard disk 23. Furthermore, the new thumbnail signal is displayed on the right-hand window of the thumbnail revision picture instead of the old thumbnail signal. When a previous picture button in the thumbnail revision picture is designated by the cursor, the old thumbnail signal is selected instead of the new thumbnail signal. In this case, the old thumbnail picture is again displayed on the right-hand window of the thumbnail revision picture. When the decision (OK) button on the remote control transmitter 20a is depressed under the conditions where the capture button in the thumbnail revision picture is designated by the cursor, the present picture displayed on the right-hand window of the thumbnail revision picture is finally defined (captured) as a new thumbnail. A signal indicative of the new thumbnail is registered in the VHS navigation data area H34 of the hard disk 23 as an after-revision thumbnail signal or a revision-resultant thumbnail signal.

Every registered thumbnail for the HDD navigation can be revised or updated as follows. When the decision (OK) button on the remote control transmitter 20a is depressed under the conditions where one of thumbnails in the head retrieval page of the HDD navigation picture is designated by the cursor, the cursor is moved to the playback button. In the case where the cursor is moved from the playback button to the revise button and then the decision (OK) button on the remote control transmitter 20a is depressed, a thumbnail revision picture for the HDD navigation (a thumbnail revision page in the HDD navigation picture) is indicated on the display of the television receiver 1. The thumbnail revision picture for the HDD navigation is the same as that in FIG. 7 except for the following point. The picture portion "HDD NAVI" replaces the picture portion "VHS NAVI". The thumbnail revision picture for the HDD navigation has a left-hand window for displaying a picture represented by a currently-reproduced contents signal (a currently-reproduced program signal), and a right-hand window for displaying a registered thumbnail corresponding to the currently-reproduced contents signal. In the thumbnail revision picture for the HDD navigation, the cursor is located at the capture button.

In the case where the thumbnail revision picture for the HDD navigation is indicated, when the playback button, the rewinding button, or the fast-feed button on the remote control transmitter 20a is operated, a corresponding program signal is reproduced from the hard disk 23 in accordance with the button operation. The reproduced program signal is displayed on the left-hand window of the thumbnail revision picture. When the decision (OK) button on the remote control transmitter 20a is depressed under the conditions where the capture button in the thumbnail revision picture is designated by the cursor, the present picture represented by the displayed program signal is sampled (captured) as a new thumbnail. A signal indicative of the new thumbnail is written over the old thumbnail signal on the HDD navigation data area H33 of the hard disk 23. Furthermore, the new thumbnail signal is displayed on the right-hand window of the thumbnail revision picture instead of the old thumbnail signal. When the previous picture button in the thumbnail revision picture is designated by the cursor, the old thumbnail signal is selected instead of the new thumbnail signal. In this case, the old thumbnail picture is again displayed on the right-hand window of the thumbnail revision picture. When the decision (OK) button on the remote control transmitter 20a is depressed under the conditions where the capture button in the thumbnail revision picture is designated by the cursor, the present picture displayed on the right-hand window of the thumbnail revision picture is finally defined (captured) as a new thumbnail. A signal indicative of the new thumbnail is registered in the HDD navigation data area H33 of the hard disk 23 as an after-revision thumbnail signal or a revision-resultant thumbnail signal.

Second Embodiment

Figure 8:
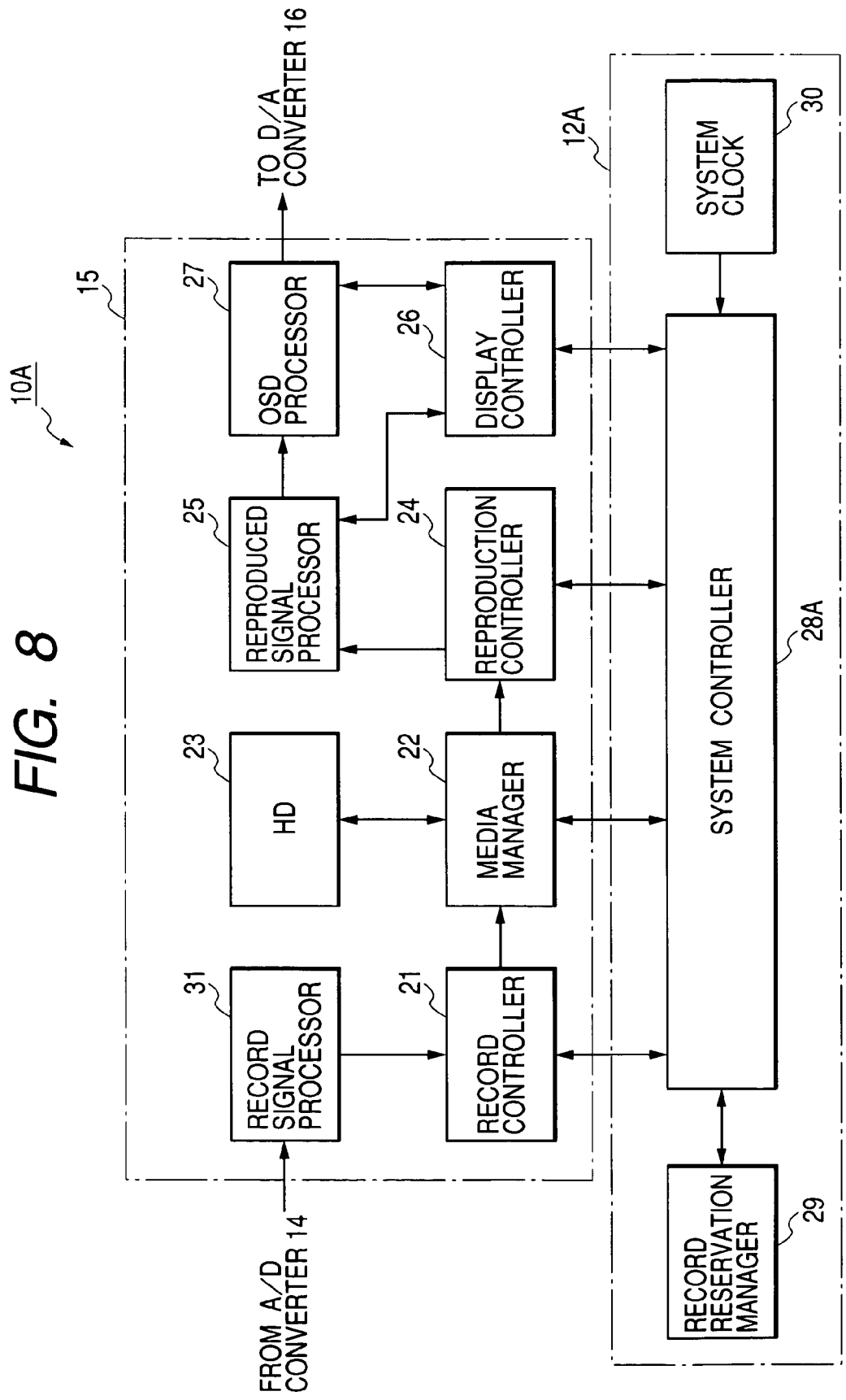
FIG. 8 is a block diagram of a CPU and an HDD in an information recording and reproducing apparatus according to a second embodiment of this invention.

FIG. 8 shows a portion of an information recording and reproducing apparatus 10A according to a second embodiment of this invention. The apparatus 10A is similar to the apparatus 10 (see FIGS. 1 and 2) except for design changes mentioned hereafter.

As shown in FIG. 8, the apparatus 10A includes a CPU 12A which replaces the CPU 12 (see FIGS. 1 and 2). The CPU 12A includes a system controller 28A instead of the system controller 28 (see FIG. 2).

The system controller 28A includes, for example, a microcomputer or a similar device having a combination of an input/output port, a processing section, a RAM, and a ROM. The system controller 28A operates in accordance with a control program stored in the ROM. The control program is designed to enable the system controller 28A to implement steps of operation which will be mentioned later.

Figure 3:
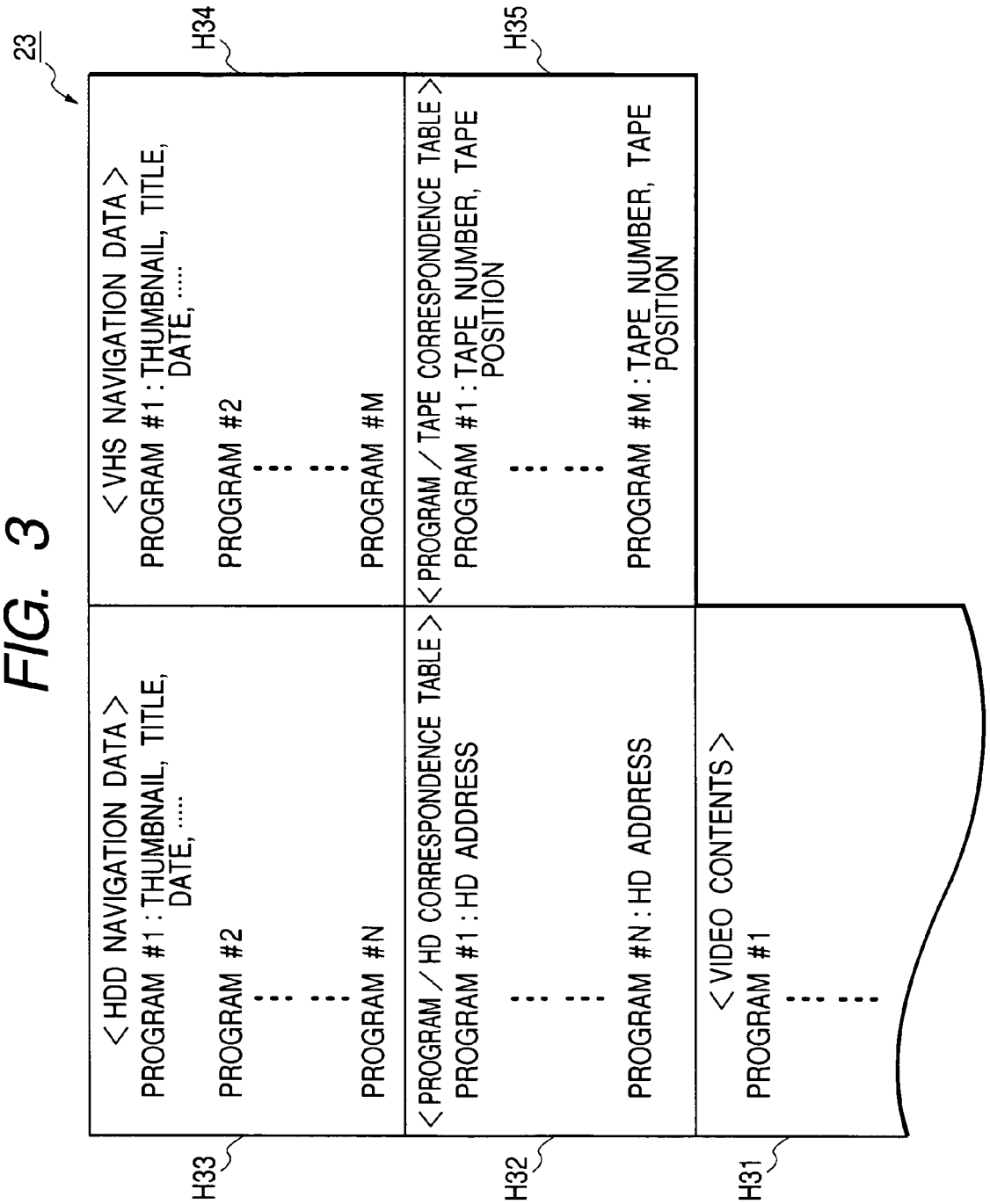
FIG. 3 is a diagram of areas of a hard disk in FIG. 2.

During the HDD recording mode of operation of the apparatus 10A, the system controller 28A receives, from the media manager 22, a signal representing a picture in a program represented by the contents signal which occurs at the start of the recording of the program (the contents signal). The system controller 28A converts the signal representative of the program start picture into a signal indicative of a thumbnail. In addition, the system controller 28A receives, from the media manager 22, information indicative of the attributes of the program represented by the contents signal. The attribute information denotes whether or not the program is of a copy inhibition type, whether or not the program is of a head-less type, whether or not the program is of a stereophonic broadcasting type, whether or not the program is of a bilingual broadcasting type, and whether or not the program is of an auto CM cut type. The copy-inhibition-related piece of the attribute information originates from copyright management information included in the contents signal. The system controller 28A receives the reservation-related information from the record reservation manager 29. On the basis of the attribute information and the reservation-related information, the system controller 28A generates signals indicative of an icon for an every-week reserved program, an icon for an every-day reserved program, an icon for a copy-inhibition program, an icon for a headless program, an icon for a stereophonic broadcasting program, an icon for a bilingual broadcasting program, an icon for a timer-recorded program, and an icon for an auto CM cut program. On the basis of the present-date information and the present-time information outputted from the system clock 30 and also command signals fed via the remote control receiver 20b, the system controller 28A generates detailed program-related information which represents a program title, a recording date, a recording channel, a recording time, a genre, and another icon or other icons The system controller 28A combines the thumbnail signal, the icon signals, and the detailed program-related information into HDD navigation data. The system controller 28A outputs the HDD navigation data to the media manager 22. The system controller 28A controls the media manager 22, thereby recording the HDD navigation data on the area H33 (see FIG. 3) in the hard disk 23.

When a program or programs are dubbed from the hard disc 23 onto the magnetic tape in the VTR 13 (see FIG. 1), a related segment or segments of the HDD navigation data are copied as VHS navigation data. The VHS navigation data are stored in the area H34 (see FIG. 3) of the hard disk 23.

When the navigation button on the remote control transmitter 20a (see FIG. 1) is depressed, a navigation command signal is transmitted from the remote control transmitter 20a to the system controller 28A via the remote control receiver 20b (see FIG. 1). The system controller 28A controls the media manager 22 in response to the navigation command signal, thereby reproducing the compression-resultant signal of the HDD navigation picture or the compression-resultant signal of the VHS navigation picture from the hard disk 23. When the navigation command signal relates to the HDD navigation, the compression-resultant signal of the HDD navigation picture is reproduced. On the other hand, when the navigation command signal relates to the VHS navigation, the compression-resultant signal of the VHS navigation picture is reproduced. The system controller 28A expands the reproduced signal of the HDD navigation picture or the reproduced signal of the VHS navigation picture. The system controller 28A outputs the expansion-resultant signal of the HDD navigation picture or the expansion-resultant signal of the VHS navigation picture to the reproduction controller 24. The reproduction controller 24 and the switch 18 are controlled by the system controller 28 so that the signal of the HDD navigation picture or the signal of the VHS navigation picture can be transmitted from the reproduction controller 24 to the television receiver 1 via the reproduced signal processor 25, the OSD processor 27, the D/A converter 16, and the switch 18. Accordingly, the HDD navigation picture or the VHS navigation picture can be indicated on the display of the television receiver 1. In addition, the system controller 28A controls the media manager 22, thereby reproducing the thumbnail signals from the hard disk 23. When the navigation command signal relates to the HDD navigation, the thumbnail signals for the HDD navigation are reproduced. On the other hand, when the navigation command signal relates to the VHS navigation, the thumbnail signals for the VHS navigation are reproduced. The system controller 28A transfers the thumbnail signals from the media manager 22 to the display controller 26. The display controller 26 feeds the thumbnail signals to the OSD processor 27. The OSD processor 27 superimposes the thumbnail signals on the signal of the HDD navigation picture or the signal of the VHS navigation picture. Thus, the HDD navigation picture or the VHS navigation picture indicated on the display of the television receiver 1 have the thumbnails at prescribed display positions. Furthermore, the system controller 28A controls the media manager 22, thereby reproducing the detailed program-related information from the hard disk 23. When the navigation command signal relates to the HDD navigation, the detailed program-related information for the HDD navigation is reproduced. On the other hand, when the navigation command signal relates to the VHS navigation, the detailed program-related information for the VHS navigation is reproduced. The system controller 28A transfers the detailed program-related information from the media manager 22 to the display controller 26. The display controller 26 feeds the detailed program-related information to the OSD processor 27. The OSD processor 27 superimposes the detailed program-related information on the signal of the HDD navigation picture or the signal of the VHS navigation picture. Thus, the HDD navigation picture or the VHS navigation picture indicated on the display of the television receiver 1 have portions corresponding to the detailed program-related information. In addition, the system controller 28A controls the media manager 22, thereby reproducing the icon signals from the hard disk 23. When the navigation command signal relates to the HDD navigation, the icon signals for the HDD navigation are reproduced. On the other hand, when the navigation command signal relates to the VHS navigation, the icon signals for the VHS navigation are reproduced. The system controller 28A transfers the icon signals from the media manager 22 to the display controller 26. The display controller 26 feeds the icon signals to the OSD processor 27. The OSD processor 27 superimposes the icon signals on the signal of the HDD navigation picture or the signal of the VHS navigation picture. Thus, the HDD navigation picture or the VHS navigation picture indicated on the display of the television receiver 1 have the icons.

Figure 9:
FIG. 9 is a diagram of examples of icons and meanings thereof.
Figure 9:
Figure 9:
Figure 9:
Figure 9:
Figure 9:
Figure 9:
Figure 9:

Examples of the icons are shown in FIG. 9. There are the icon for an every-week reserved program, the icon for an every-day reserved program, the icon for a copy-inhibition program, the icon for a head-less program, the icon for a stereophonic broadcasting program, the icon for a bilingual broadcasting program, the icon for a timer-recorded program, and the icon for an auto CM cut program.

In the HDD navigation picture or the VHS picture, the icon for an every-week reserved program, the icon for an every-day reserved program, the icon for a copy-inhibition program, and the icon for a head-less program are located in a region above the related thumbnail. In the HDD navigation picture or the VHS picture, the icon for a stereophonic broadcasting program, the icon for a bilingual broadcasting program, the icon for a timer-recorded program, and the icon for an auto CM cut program are located in a region below the related thumbnail.

The icon for an every-week reserved program, the icon for an every-day reserved program, and the icon for a copy-inhibition program are used by the HDD navigation only. The icon for a headless program and the icon for an auto CM cut program are used by the VHS navigation only. The icon for a stereophonic broadcasting program, the icon for a bilingual broadcasting program, and the icon for a timer-recorded program are used by both the HDD navigation and the VHS navigation.

A program signal transmitted from a BS digital broadcasting station and a program signal reproduced from a DVD (digital versatile disc) contain copyright management information. Generally, the copyright management information represents "copy inhibited", "copy permitted only once", or "copy permitted". The system controller 28A gets the copyright management information from the program signal via the media manager 22. The system controller 28A generates the signal indicative of the icon for a copy-inhibition program on the basis of the copyright management information. In the case where a program signal containing copyright management information representing "copy permitted only once" is intended to be recorded on the hard disk 23, the system controller 28A updates or changes the copyright management information to represent "copy inhibited" before the program signal is actually recorded on the hard disk 23. In this case, the system controller 28A generates the signal indicative of the icon for a copy-inhibition program on the basis of the updated copyright management information.

What is claimed is:

1. An information recording and reproducing apparatus comprising:

first means for recording a plurality of first video-contents signals on a first recording medium;

second means for recording a plurality of second video-contents signal on a second recording medium differing from the first recording medium and being removable;

third means for generating signals representative of thumbnails in response to the second video-contents signals respectively and recording the signals representative of the thumbnails on the first recording medium in cases where the second means records the plurality of the second video-contents signals on the second recording medium; and fourth means for reproducing the signals representative of the thumbnails from the first recording medium to enable the thumbnails to be displayed.

2. An information recording and reproducing apparatus as recited in claim 1, further comprising fifth means for designating ones among the displayed thumbnails, sixth means for designating an order about the designated thumbnails, and seventh means for sequentially reproducing ones among the second video-contents signals, which correspond to the designated thumbnails respectively, from the second recording medium in an order corresponding to the designated order.

3. An information recording and reproducing apparatus as recited in claim 1, further comprising fifth means for generating signals representative of thumbnails in response to the first video-contents signals respectively and recording the signals representative of the thumbnails on the first recording medium in cases where the first means records the plurality of the first video-contents signals on the first recording medium, sixth means for dubbing ones among the first video-contents signals from the first recording medium onto the second recording medium as new second video-contents signals recorded on the second recording medium, and seventh means for using the signals representative of the thumbnails corresponding to the dubbed ones among the first video-contents signals as signals representative of thumbnails corresponding to the new second video-contents signals.

4. An information recording and reproducing apparatus as recited in claim 1, wherein the third means comprises means for, when the second means starts recording each of the plurality of the second video-contents signals on the second recording medium, capturing a picture represented by each of the plurality of the second video-contents signals as a thumbnail, and means for updating the thumbnails.

5. An information recording and reproducing apparatus as recited in claim 1, further comprising fifth means for designating one among the displayed thumbnails, sixth means for reproducing one among the second video-contents signals, which corresponds to the designated thumbnail, from the second recording medium, seventh means for displaying the second video-contents signal reproduced by the sixth means, eighth means for capturing a picture represented by the displayed second video-contents signal at a designated moment, and ninth means for replacing the thumbnail corresponding to the displayed second video-contents signal by the captured picture.

6. An information recording and reproducing apparatus comprising:
  first means for recording a plurality of video-contents signals on a first recording medium;
  second means for generating signals representative of thumbnails in response to the video-contents signals respectively and recording the signals representative of the thumbnails on the first recording medium in cases where the first means records the plurality of the video-contents signals on the first recording medium;
  third means for reproducing the signals representative of the thumbnails from the first recording medium to enable the thumbnails to be displayed;
  fourth means for designating ones among the displayed thumbnails;
  fifth means for designating an order about the designated thumbnails;
  sixth means for sequentially reproducing ones among the video-contents signals, which correspond to the designated thumbnails respectively, from the first recording medium in an order corresponding to the order designated by the fifth means to enable the sequentially reproduced video-contents signals to be displayed; and
  seventh means for sequentially dubbing ones among the video-contents signals, which correspond to the designated thumbnails respectively, from the first recording medium onto a second recording medium in an order corresponding to the order designated by the fifth means, the second recording medium differing from the first recording medium and being removable;
  wherein the first means comprises means for compressing the video-contents signals into compression-resultant signals, and means for recording the compression-resultant signals on the first recording medium, and wherein each of the sixth means and seventh means comprises means for reading out ones among the compression-resultant signals, which correspond to the designated thumbnails respectively, from the first recording medium, and means for expanding the read-out compression-resultant signals into the video-contents signals.

7. An information recording and reproducing apparatus comprising:
  first means for recording a plurality of video-contents signals on a recording medium;
  second means for generating signals representative of thumbnails in response to the video-contents signals respectively and recording the signals representative of the thumbnails on the recording medium;
  third means for reproducing the signals representative of the thumbnails from the recording medium and enabling the thumbnails to be displayed in first thumbnail display positions respectively; and
  fourth means for, in the presence of a video-contents signal in recording reservation, generating a signal representative of a condition of reservation of the video-contents signal in recording reservation and enabling the condition of reservation to be displayed in a second thumbnail display position next to end one of the first thumbnail display positions.

8. An information recording and reproducing apparatus as recited in claim 7, further comprising fifth means for recording the video-contents signal in reservation on the recording medium, sixth means for generating a signal representative of a thumbnail in response to the video-contents signal in reservation when the fifth means starts recording the video-contents signal in reservation, seventh means for recording the signal representative of the thumbnail corresponding to the video-contents signal in reservation on the recording medium, and eighth means for replacing the condition of reservation by the thumbnail corresponding to the video-contents signal in reservation and enabling the thumbnail to be displayed in the second thumbnail display position.

9. An information recording and reproducing apparatus as recited in claim 8, further comprising ninth means for generating a signal representative of a new thumbnail in response to the video-contents signal in reservation at a moment a predetermined-time after the sixth means generates the signal representative of the old thumbnail, tenth means for recording the signal representative of the new thumbnail over the signal representative of the old thumbnail on the recording medium, and eleventh means for replacing the old thumbnail by the new thumbnail and enabling the new thumbnail to be displayed in the second thumbnail display position.

* * * * *

UNITED STATES PATENT AND TRADEMARK OFFICE
CERTIFICATE OF CORRECTION

PATENT NO. : 7,158,713 B2  
APPLICATION NO. : 09/962239  
DATED : January 2, 2007  
INVENTOR(S) : Nobuyuki Goto et al.

It is certified that error appears in the above-identified patent and that said Letters Patent is hereby corrected as shown below:

On Title page

Item (73) Assignee: "Victor Company Japan, Ltd." should read
-- Victor Company of Japan, Ltd. --

Signed and Sealed this

Tenth Day of April, 2007

JON W. DUDAS  
*Director of the United States Patent and Trademark Office*